(12) United States Patent
Nariman et al.

(10) Patent No.: US 7,737,872 B2
(45) Date of Patent: *Jun. 15, 2010

(54) DAC MODULE AND APPLICATIONS THEREOF

(75) Inventors: Mohammad Nariman, Irvine, CA (US); Alireza Zolfaghari, Irvine, CA (US); Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/142,918

(22) Filed: Jun. 20, 2008

(65) Prior Publication Data

US 2008/0284629 A1 Nov. 20, 2008

Related U.S. Application Data (63) Continuation of application No. 11/638,622, filed on Dec. 13, 2006, now Pat. No. 7,463,176.

(51) Int. Cl.
*H03M 1/66* (2006.01)

(52) U.S. Cl. .................................. 341/144; 341/122

(58) Field of Classification Search ......... 341/122–125, 341/144
See application file for complete search history.

(56) References Cited

U.S. PATENT DOCUMENTS

| | | | |
|---|---|---|---|
| 4,381,495 A | | 4/1983 | Hotta et al. |
| 4,471,340 A | * | 9/1984 | Lewis ........................ 341/157 |
| 4,845,498 A | | 7/1989 | Kubo et al. |
| 4,864,305 A | | 9/1989 | Toyama |
| 7,183,949 B2 | | 2/2007 | Park |
| 7,463,176 B2 | * | 12/2008 | Nariman et al. ............. 341/144 |
| 7,463,696 B2 | | 12/2008 | Simon |
| 7,564,922 B2 | | 7/2009 | Kim et al. |

\* cited by examiner

*Primary Examiner*—Brian Young
(74) *Attorney, Agent, or Firm*—Garlick Harrison & Markison; Timothy W. Markison; Jessica W. Smith (57) ABSTRACT

A digital to analog conversion (DAC) module includes a digital to analog converter, a sample and hold circuit, and a switch module. The digital to analog converter is coupled to convert a digital signal into an analog signal. The sample and hold circuit is coupled to sample the analog signal to produce a sampled analog signal. The switch module is coupled to provide the analog signal as an output of the DAC module when the DAC module in a first mode and to output the analog signal to the sample and hold circuit when the DAC module in a second mode, wherein the sampled analog signal provides the output of the DAC module in the second mode.

14 Claims, 6 Drawing Sheets

DAC MODULE AND APPLICATIONS THEREOF

This patent application is claiming priority under 35 USC §120 as a continuing patent application of co-pending patent application entitled DAC MODULE AND APPLICATIONS THEREOF, having a filing date of Dec. 13, 2006, and a Ser. No. of 11/638,622.

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to components of transmitters used within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802. 11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As the trend for wireless communication devices to support multiple standards continues, recent trends include the desire to integrate the RF portions (i.e., the one or more IF stages and the power amplifier) of GSM and EDGE on to a single chip. As is known, GSM uses a GMSK data modulation scheme and EDGE uses an 8-PSK data modulation scheme, which have different requirements for the RF portion of the transmitter as described above.

Therefore, a need exists for a transmitter that includes a front-end that enables the transmitter to support multiple standards having different data modulation schemes.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
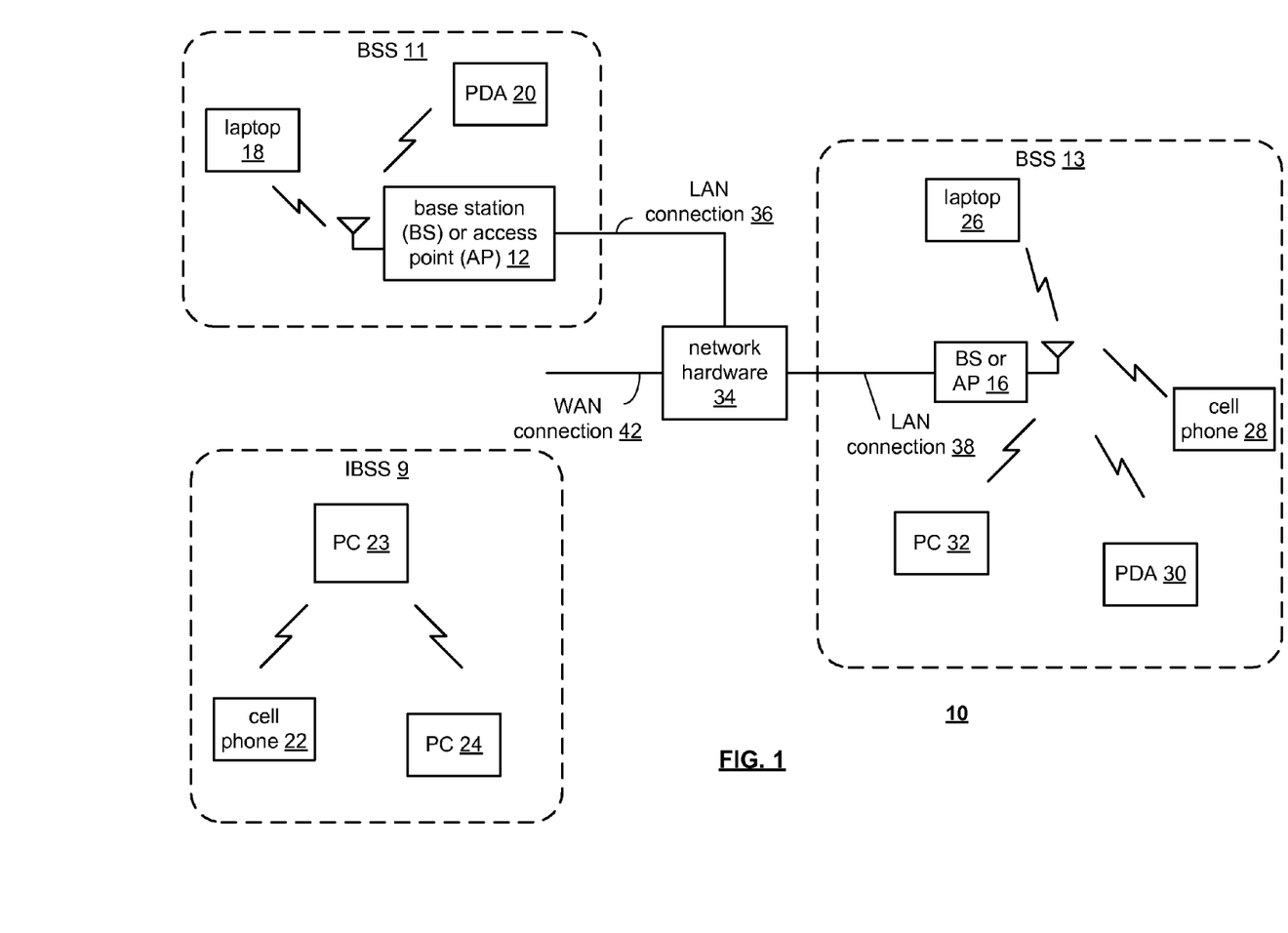
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 2-8.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular voice and/or data telephone systems and like-type systems, while access points are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag.

Figure 2:
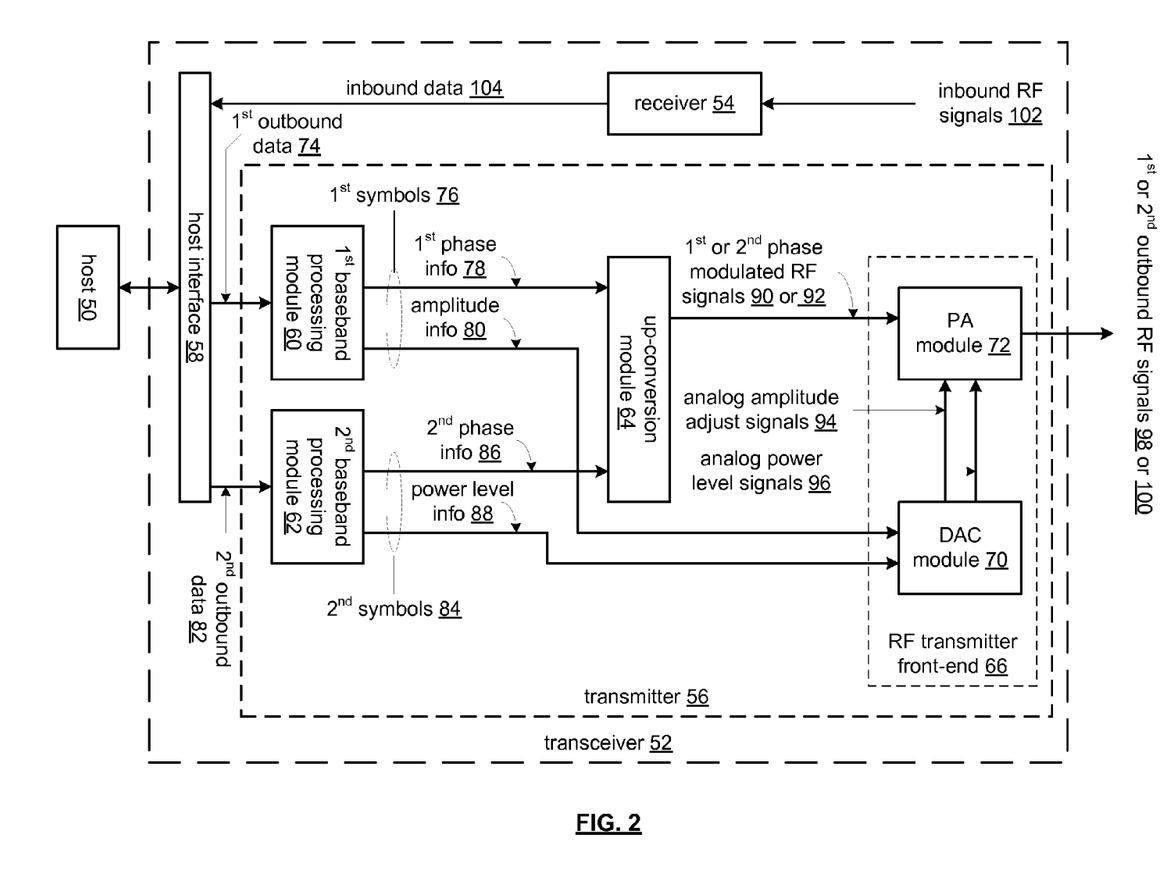
FIG. 2 is a schematic block diagram of an embodiment of a wireless communication device in accordance with the present invention.

FIG. 2 is a schematic block diagram of an embodiment of a wireless communication device 18-32 that includes a host device 50 and a transceiver 52. The host device 50 may include laptop computer circuitry, personal computer circuitry, PDA circuitry, cellular voice and/or data processing circuitry, personal entertainment circuitry, and/or a processing module. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may include an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information.

The transceiver 52 includes a receiver 54, a transmitter 56, and a host interface 58. The transmitter 56 includes a $1^{st}$ baseband processing module 60, a $2^{nd}$ baseband processing module 62, an up-conversion module 64, and a radio frequency (RF) front-end 66. The RF front-end 66 includes a digital to analog conversion (DAC) module 70 and a power amplifier (PA) module 72. The $1^{st}$ and $2^{nd}$ baseband processing modules 60 and 62 may be separate processing modules or a common processing module. Such a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 2-8.

The receiver 54, which function in accordance with one or more standards (e.g., GSM, EDGE, CDMA, GPRS, etc.), receives inbound RF signals 102 and converts them into inbound data 104. The inbound data 104 is provided to the host device 50 via the host interface 58. For example, if the inbound RF signals are in accordance with Gaussian Minimum Shift Keying (GMSK) of a version of the GSM standard, they are phase modulated RF signals. In this example, the receiver 64 extracts the phase information from the phase modulated RF signals and converts the phase information into the inbound data 104. As another example, if the inbound RF signals are in accordance with 8-PSK (phase shift keying) of a version of the EDGE standard, they are phase and amplitude modulated RF signals. In this example, the receiver 64 extracts phase information and modulation information from the phase and amplitude modulated RF signals and converts the phase information and amplitude information into the inbound data 104.

The transmitter 56 receives $1^{st}$ or $2^{nd}$ outbound data 74 or 82 from the host device 50 via the host interface 58. The $1^{st}$ outbound data 74 corresponds to data that is to be transmitted in accordance with a wireless communication standard that employs a data modulation scheme having varying amplitudes and varying phases (e.g., 8-PSK of EDGE, quadrature amplitude modulation of IEEE 802. 11, etc.) and the $2^{nd}$ outbound data 82 corresponds to data that is be transmitted in accordance with a wireless communication standard that employs a data modulation scheme having varying phases (e.g., GSMK of GSM and GPRS, quadrature-PSK of CDMA, etc.).

When the host device 50 desires to transmit the $1^{st}$ outbound data 74 (e.g., an EDGE data transmission), the host device 50 places the transmitter 56 in a first mode. In the first mode, the $1^{st}$ baseband processing module 60 is active to receive the $1^{st}$ outbound data 74. The $1^{st}$ baseband processing module 60 converts the $1^{st}$ outbound data 74 into first symbols 76 that include first phase information 76 and amplitude information 80. In one embodiment, the $1^{st}$ baseband processing module 60 may encode, puncture, map, interleave, and/or domain convert the $1^{st}$ outbound data 74 into polar coordinate symbols of amplitude information 80 (A) and phase information 78 ($\Phi$). For example, if the baseband processing utilizes an 8-PSK data modulation scheme, a first outbound data value and a second outbound data value may be ½ rate encoded to produce $1^{st}$ and $2^{nd}$ encoded values. After puncturing, the encoded values may be interleaved to produce a first interleaved value and a second interleaved value. The first interleaved value is mapped into an amplitude value of $A_0$ and a phase value of $\Phi_0$ and the second interleaved value is mapped into an amplitude value of $A_1$ and a phase value of $\Phi_1$.

The up-conversion module 64, which will be described in greater detail with reference to FIG. 3, receives the $1^{st}$ phase information 78 and produces therefrom $1^{st}$ phase modulated RF signals 90. The DAC module 70 receives the amplitude information 80 and converts it into analog amplitude adjust signals 94. The PA module 72 amplifies the $1^{st}$ phase modulate RF signals 90 in accordance with the analog amplitude adjust signals 94 to produce $1^{st}$ outbound RF signals 98. Note that the RF front-end 66 and/or the up-conversion module 64 may include synchronization circuitry to insure that the $1^{st}$ phase modulated RF signals 90 and the analog amplitude adjust signals 94 correspond, in time, with the $1^{st}$ phase information 78 and amplitude information 80.

When the host device 50 desires to transmit the $2^{nd}$ outbound data 82 (e.g., a GSM voice transmission), the host device 50 places the transmitter 56 in a second mode. In the second mode, the $2^{nd}$ baseband processing module 62 is active to convert the $2^{nd}$ outbound data 82 into $2^{nd}$ symbols 84 that include $2^{nd}$ phase information 86 and may also generate power level information 88. In one embodiment, the $2^{nd}$ baseband processing module 62 may encode, puncture, map, interleave, and/or domain convert the $2^{nd}$ outbound data 82 into polar coordinate symbols of fixed amplitude (A) and $2^{nd}$ phase information 86 ($\Phi$). For example, if the baseband processing utilizes an QPSK data modulation scheme, a first outbound data value and a second outbound data value may be ½ rate encoded to produce $1^{st}$ and $2^{nd}$ encoded values. After puncturing, the encoded values may be interleaved to produce a first interleaved value and a second interleaved value. The first interleaved value is mapped into a fixed amplitude value of A and a phase value of (o and the second interleaved value is mapped into the amplitude value of A and a phase value of $\Phi_1$. The baseband processing module 62 may then generate a power transmission level 88.

The up-conversion module 64 converts the $2^{nd}$ phase information 86 of the $2^{nd}$ symbols 84 into $2^{nd}$ phase modulated RF signals 92. The DAC module 70 converts the power level information 88 into analog power level signals 96. The PA module 72 amplifies the $2^{nd}$ phase modulated RF signals 92 in accordance with the analog power level signals 96 to produce $2^{nd}$ outbound RF signals 100.

In one embodiment, the $1^{st}$ baseband processing module 60, the $2^{nd}$ baseband processing module 62, the up-conversion module 64, the digital to analog conversion module 70, and a power amplifier driver of the power amplifier module 70 are on a die of an integrated circuit and a power amplifier coupled to the power amplifier module 72 is an external component with respect to the integrated circuit. In another embodiment, the power amplifier module 72 includes power amplifier driver and a power amplifier that are on the same die of an integrated circuit as the $1^{st}$ baseband processing module 60, the $2^{nd}$ baseband processing module 62, the up-conversion module 64, and the digital to analog conversion module 70.

Figure 3:
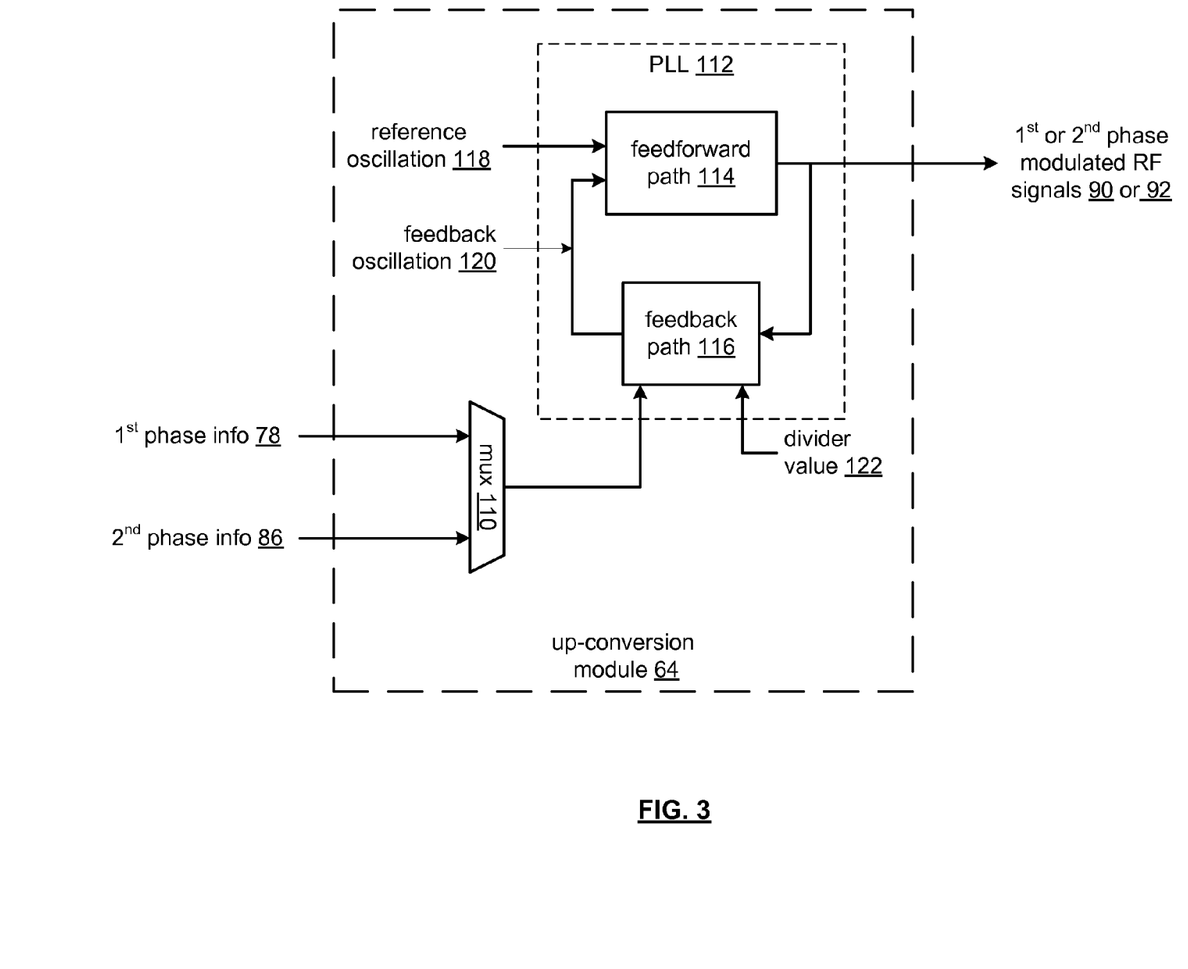
FIG. 3 is a schematic block diagram of an embodiment of an up-conversion module in accordance with the present invention.

FIG. 3 is a schematic block diagram of an embodiment of an up-conversion module 64 that includes a multiplexer 110 and a phase locked loop (PLL) 112. The PLL 112 includes a forward path 114 and a feedback path 116. When the transmitter is in the first mode, the multiplexer 110 provides the St phase information 78 to the feedback path 116 of the PLL 112. The feedback path 116 (which may include a fixed divider module, a fractional-N divider module, and/or a variable divider module) generates a feedback oscillation 120 based on the $1^{st}$ phase modulated RF signals 90, a divider value, and the $1^{st}$ phase information 78. The forward path 114, which may include a phase and/or frequency detector, a charge pump, a loop filter, and a voltage controlled oscillator, generates the $1^{st}$ phase modulated RF signals 90 from a reference oscillation 118 and the feedback oscillation 120.

When the transmitter is in the second mode, the multiplexer 110 provides the $2^{nd}$ phase information 86 to the feedback path 116 of the PLL 112. The feedback path 116 generates the feedback oscillation 120 based on the $2^{nd}$ phase modulated RF signals 92, a divider value, and the $2^{nd}$ phase information 86. The forward path 114 generates the $2^{nd}$ phase modulated RF signals 92 from a reference oscillation 118 and the feedback oscillation 120.

Figure 4:
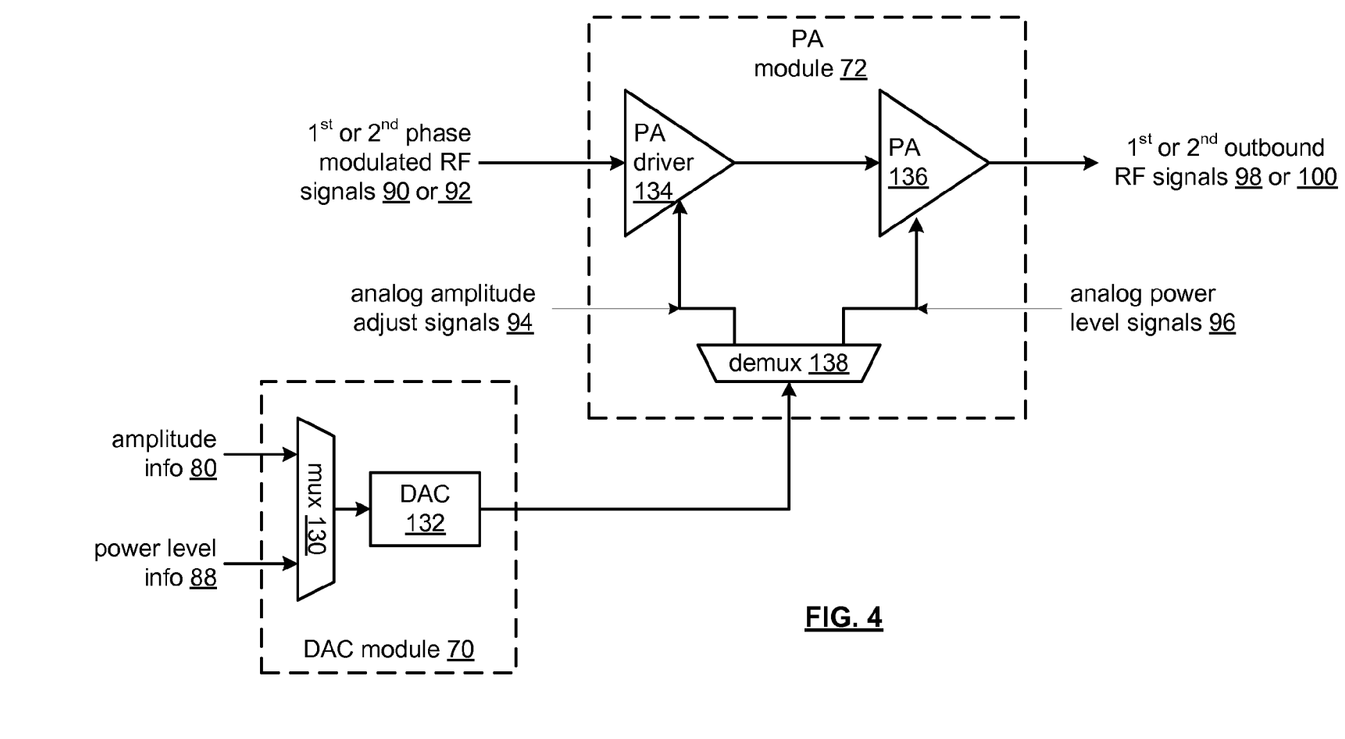
FIG. 4 is a schematic block diagram of an embodiment of a DAC module and an embodiment of a power amplifier module in accordance with the present invention.

FIG. 4 is a schematic block diagram of an embodiment of a DAC module 70 and an embodiment of a power amplifier module 72. The DAC module 70 includes a multiplexer 130 and a digital to analog converter (DAC) 132. The PA module 72 includes a power amplifier driver 134, a power amplifier 136, and a demultiplexer 138.

The multiplexer 130, which may be a multiplexer, switching network, and/or gating device, outputs the amplitude information 80 when the transmitter 56 is in the first mode and outputs the power level information 88 when the transmitter 56 is in the second mode. The digital to analog converter 132, which may be a sigma delta DAC, converts the amplitude information 80 into the analog amplitude adjust signals 94 and to convert the power level information 88 into the analog power level signals 96.

The power amplifier driver 134, which may include one or more drivers coupled in parallel and/or in series, is coupled in series with the power amplifier 136, which may include one or more amplifiers coupled in parallel and/or in series. In one embodiment, the power amplifier 136 is off-chip with respect to the power amplifier drive 134 and in another embodiment the power amplifier 136 is on the same chip as the power amplifier driver 134. When the transmitter 56 is in the first mode, the demultiplexer 138, which may be a demultiplexer, a switching network, and/or gating device, provides the analog amplitude adjust signals 94 to the power amplifier driver 134.

In the first mode, the power amplifier driver 134 amplifies the $1^{st}$ phase modulated RF signals 90 in accordance with the analog amplitude adjust signals 94 to produce driver amplified first phase modulated RF signals. The power amplifier 136 amplifies the driver amplified first phase modulated RF signals in accordance with a power amplifier gain setting, which may be a default setting or programmed by the $1^{st}$ baseband processing module 60, to produce the first outbound RF signals 98.

When the transmitter 56 is in the second mode, the demultiplexer 138 provides the analog power level signals 96 to the power amplifier 136. The power amplifier driver 134 amplifies the second phase modulated RF signals 92 in accordance with a driver gain setting, which may be a default setting or programmed by the $2^{nd}$ baseband processing module 62, to produce driver amplified second phase modulated RF signals. The power amplifier 136 amplifies the driver amplified second phase modulated RF signals in accordance with the analog power level signals 96 to produce the $2^{nd}$ outbound RF signals 100.

Figure 5:
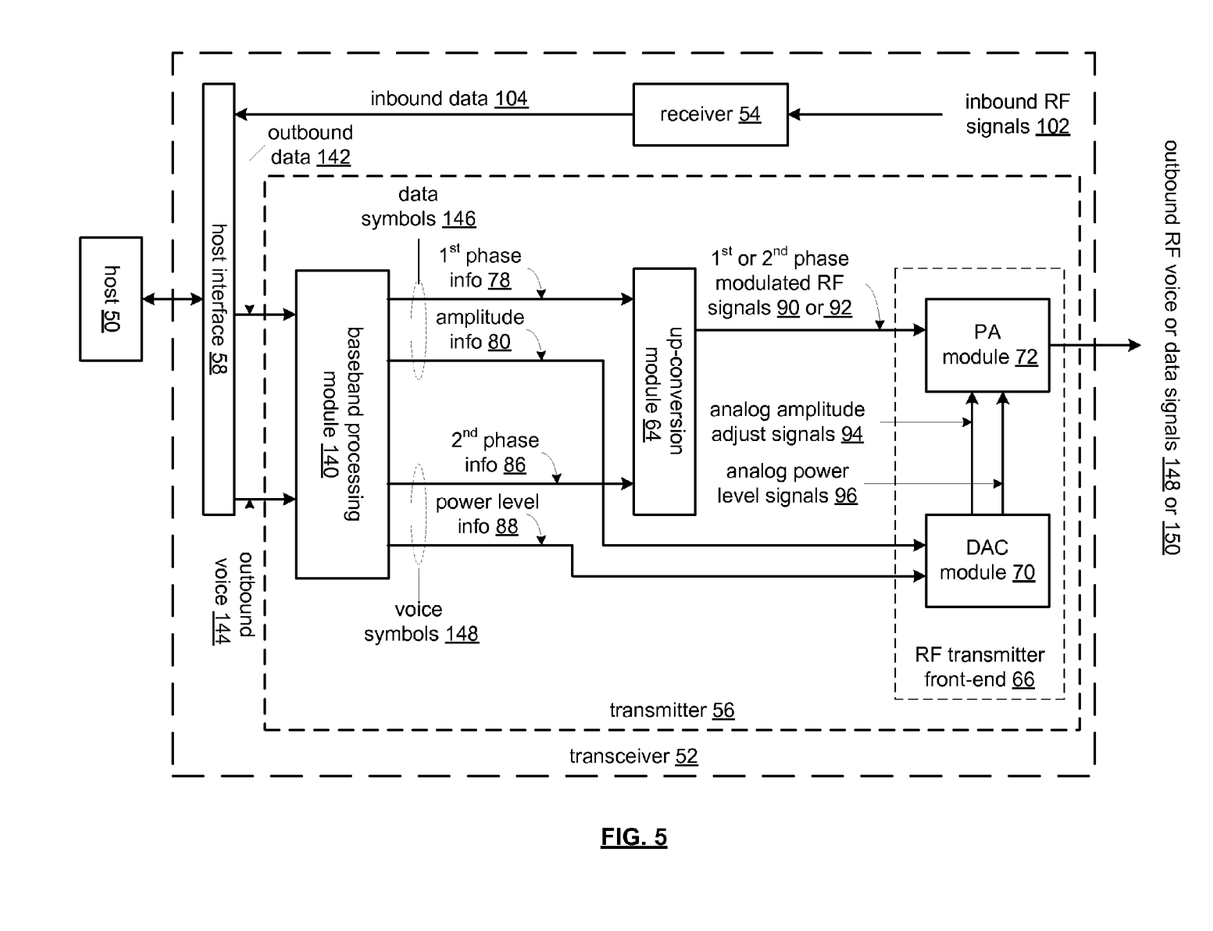
FIG. 5 is a schematic block diagram of another embodiment of a wireless communication device in accordance with the present invention.

FIG. 5 is a schematic block diagram of another embodiment of a wireless communication device 18-32 that includes a host device 50 and a transceiver 52. The host device 50 may include laptop computer circuitry, personal computer circuitry, PDA circuitry, cellular voice and/or data processing circuitry, personal entertainment circuitry, and/or a processing module.

The transceiver 52 includes a receiver 54, a transmitter 56, and a host interface 58. The transmitter 56 includes a baseband processing module 140, an up-conversion module 64, and a radio frequency (RF) front-end 66. The RF front-end 66 includes a digital to analog conversion (DAC) module 70 and a power amplifier (PA) module 72. The baseband processing modules 140 may be a processing module. Such a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 2-8.

The receiver 54, which function in accordance with one or more standards (e.g., GSM, EDGE, CDMA, GPRS, etc.), receives inbound RF signals 102 and converts them into inbound data 104. The inbound data 104 is provided to the host device 50 via the host interface 58. For example, if the inbound RF signals are in accordance with Gaussian Minimum Shift Keying (GMSK) of a version of the GSM standard, they are phase modulated RF signals. In this example, the receiver 64 extracts the phase information from the phase modulated RF signals and converts the phase information into the inbound data 104. As another example, if the inbound RF signals are in accordance with 8-PSK (phase shift keying) of a version of the EDGE standard, they are phase and amplitude modulated RF signals. In this example, the receiver 64 extracts phase information and modulation information from the phase and amplitude modulated RF signals and converts the phase information and amplitude information into the inbound data 104.

The transmitter 56 receives outbound data signals 142 or outbound voice signals 144 from the host device 50 via the host interface 58. The outbound data signals 142 correspond to data that is to be transmitted in accordance with a wireless communication standard that employs a data modulation scheme having varying amplitudes and varying phases (e.g., 8-PSK of EDGE, quadrature amplitude modulation of IEEE 802.11, etc.) and the voice outbound signals 144 correspond to digitized voice signals that are be transmitted in accordance with a wireless communication standard that employs a data modulation scheme having varying phases (e.g., GSMK of GSM, quadrature-PSK of CDMA, etc.).

When the host device 50 desires to transmit the outbound data signals 142 (e.g., an EDGE data transmission), the host device 50 places the transmitter 56 in a first mode. In the first mode, the baseband processing module 140 receives converts the outbound data signals 142 into data symbols 146 that include first phase information 76 and amplitude information 80. In one embodiment, the baseband processing module 140 may encode, puncture, map, interleave, and/or domain convert the outbound data signals 142 into polar coordinate symbols of amplitude information 80 (A) and phase information 78 (Φ). For example, if the baseband processing utilizes an 8-PSK data modulation scheme, a first outbound data value and a second outbound data value may be ½ rate encoded to produce $1^{st}$ and $2^{nd}$ encoded values. After puncturing, the encoded values may be interleaved to produce a first interleaved value and a second interleaved value. The first interleaved value is mapped into an amplitude value of $A_0$ and a phase value of $\Phi_0$ and the second interleaved value is mapped into an amplitude value of A1 and a phase value of $\Phi_1$.

The up-conversion module 64 receives the $1^{st}$ phase information 78 and produces therefrom $1^{st}$ phase modulated RF signals 90. The DAC module 70 receives the amplitude information 80 and converts it into analog amplitude adjust signals 94. The PA module 72 amplifies the $1^{st}$ phase modulate RF signals 90 in accordance with the analog amplitude adjust signals 94 to produce outbound RF data signals 150. Note that the RF front-end 66 and/or the up-conversion module 64 may include synchronization circuitry to insure that the $1^{st}$ phase modulated RF signals 90 and the analog amplitude adjust signals 94 correspond, in time, with the $1^{st}$ phase information 78 and amplitude information 80.

When the host device 50 desires to transmit the outbound voice signals 144 (e.g., a GSM voice transmission), the host device 50 places the transmitter 56 in a second mode. In the second mode, the baseband processing module 140 converts the outbound data voice signals 144 into voice symbols 148 that include $2^{nd}$ phase information 86 and may also generate power level information 88. In one embodiment, the baseband processing module 140 may encode, puncture, map, interleave, and/or domain convert the outbound voice signals 144 into polar coordinate symbols of fixed amplitude (A) and $2^{nd}$ phase information 86 ($\Phi$). For example, if the baseband processing utilizes a QPSK data modulation scheme, a first outbound data value and a second outbound data value may be ½ rate encoded to produce $1^{st}$ and $2^{nd}$ encoded values. After puncturing, the encoded values may be interleaved to produce a first interleaved value and a second interleaved value. The first interleaved value is mapped into a fixed amplitude value of A and a phase value of $\Phi_0$ and the second interleaved value is mapped into the amplitude value of A and a phase value of $\Phi_1$. The baseband processing module 140 may then generate a power transmission level 88.

The up-conversion module 64 converts the $2^{nd}$ phase information 86 of the $2^{nd}$ symbols 84 into $2^{nd}$ phase modulated RF signals 92. The DAC module 70 converts the power level information 88 into analog power level signals 96. The PA module 72 amplifies the $2^{nd}$ phase modulated RF signals 92 in accordance with the analog power level signals 96 to produce $2^{nd}$ outbound RF signals 100.

In one embodiment, the baseband processing module 140, the up-conversion module 64, the digital to analog conversion module 70, and a power amplifier driver of the power amplifier module 70 are on a die of an integrated circuit and a power amplifier coupled to the power amplifier module 72 is an external component with respect to the integrated circuit. In another embodiment, the power amplifier module 72 includes power amplifier driver and a power amplifier that are on the same die of an integrated circuit as the baseband processing module 140, the up-conversion module 64, and the digital to analog conversion module 70.

Figure 6:
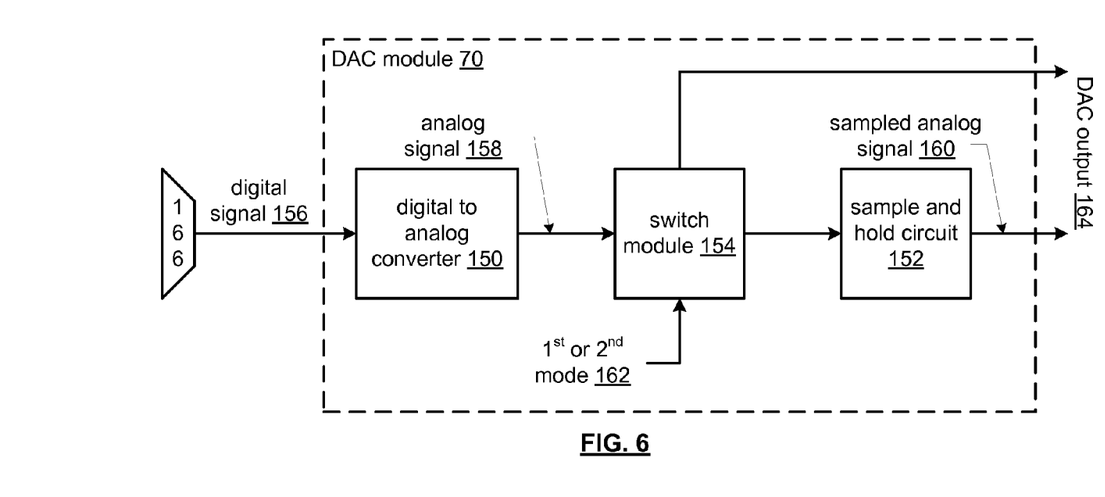
FIG. 6 is a schematic block diagram of another embodiment of a DAC module in accordance with the present invention.

FIG. 6 is a schematic block diagram of another embodiment of a DAC module 70 that includes a digital to analog converter 150, a switch module 154, and a sample-&-hold circuit 152. The digital to analog converter 150 (an embodiment of which will be described in greater detail with reference to FIG. 7) receives a digital signal 156 from a multiplexer 166. In one embodiment, the multiplexer 166 provides the amplitude information 80 as the digital signal 156 when the transmitter is in the first mode and provides the power level information 88 when the transmitter is in the second mode.

The digital to analog converter 150 converts the digital signals 156 into an analog signal 158. When the transmitter is in the first mode, the analog signal 158 may be the analog amplitude adjust signals 94 and when the transmitter is in the second mode, the analog signal 158 may be the analog power level signals 96. When the transmitter is in the second mode 162, the switching module 154 (which may be a multiplexer, switching network, and/or a gating device) provides the analog signal 158 (e.g., the analog power level signals 96) as the output of the DAC module 70.

When the transmitter is in the first mode 162, the switching module 154 provides the analog signal 158 (e.g., the analog amplitude adjust signals 94) to the sample-&-hold circuit 152. The output of the sample-&-hold circuit 152 provides the output of the DAC module 70. Note that the sample-&-hold circuit 152 is clocked such that the analog amplitude adjust signals 94 are provided to the PA module 72 in synchronization with the $1^{st}$ phase modulated RF signals 90.

Figure 7:
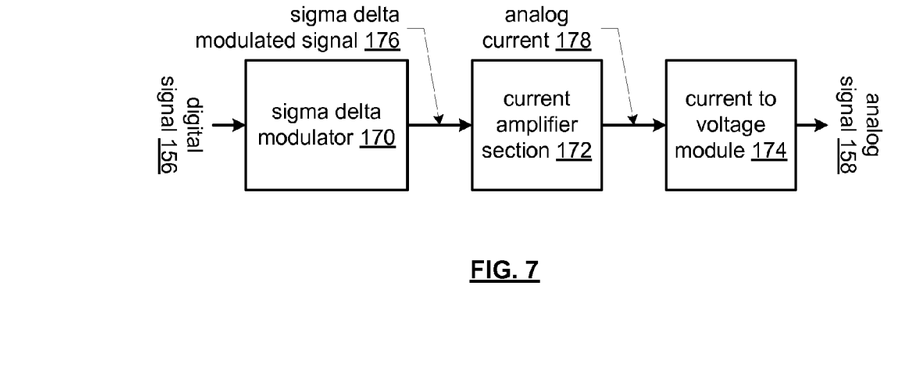
FIG. 7 is a schematic block diagram of an embodiment of a digital to analog converter in accordance with the present invention.

FIG. 7 is a schematic block diagram of an embodiment of a digital to analog converter 150 that includes a sigma delta modulator 170, a current amplifier section 172, and a current to voltage module 174. The sigma-delta modulator 170, which may be a second order or greater sigma delta modulator, converts to the digital signal 156 into a sigma-delta modulated signal 176. The current amplifier section 172, which may include a transconductance amplifier, weighted current sources, and a resistive network, converts the sigma-delta modulated signal 176 into an analog current 178. The current to voltage module 174 converts the analog current 178 into the analog signal 158.

Figure 8:
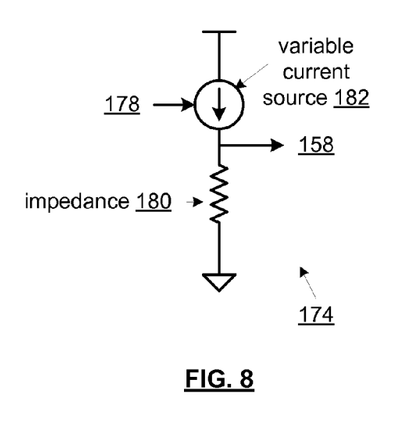
FIG. 8 is a schematic block diagram of an embodiment of a current to voltage module in accordance with the present invention.

FIG. 8 is a schematic block diagram of an embodiment of a current to voltage module 174 that includes a variable current source 182 and an impedance 180. The variable current source 182 is varied based on the analog current 178 to produce a reference current, which flows through impedance 180 to establish a voltage representation of the analog signal 158. In one embodiment, the impedance includes a variable impedance coupled to produce the analog signal in accordance with a current-to-voltage gain setting (e.g., an impedance setting set by the baseband processing module 140). In another embodiment, the variable current source 182 is coupled to produce a reference current based on the analog current and a current-to-voltage gain setting (e.g., a bias level set by the baseband processing module 140).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A digital to analog conversion (DAC) module comprises:
   a digital to analog converter coupled to convert a digital signal into an analog signal;
   a sample and hold circuit coupled to sample the analog signal to produce a sampled analog signal; and
   a switch module coupled to provide the analog signal as an output of the DAC module when the DAC module is in a first mode and to output the analog signal to the sample and hold circuit when the DAC module is in a second mode, wherein the sampled analog signal provides the output of the DAC module in the second mode.

2. The DAC module of claim 1, wherein the digital to analog converter comprises:
   a sigma-delta modulator coupled to convert to the digital signal into a sigma-delta modulated signal;
   a current amplifier section coupled to convert the sigma-delta modulated signal into an analog current; and
   a voltage to current module coupled to convert the analog current into the analog signal.

3. The DAC module of claim 2, wherein the voltage to current module comprises:
   a variable current source coupled to produce a reference current based on the analog current; and
   an impedance coupled to produce the analog signal based on the reference current.

4. The DAC module of claim 3, wherein the impedance comprises:
   a variable impedance coupled to produce the analog signal in accordance with a current-to-voltage gain setting.

5. The DAC module of claim 3, wherein the voltage to current module comprises:
   the variable current source coupled to produce a reference current based on the analog current and a current-to-voltage gain setting.

6. The DAC module of claim 1 further comprises:
   a multiplexer coupled to provide a first digital signal as the digital signal when the DAC module is in the first mode and coupled to provide a second digital signal as the digital signal when the DAC module is in the second mode.

7. The DAC module of claim 1 further comprises:
   the first mode including an amplitude modulation mode; and
   the second mode including a power level mode.

8. The DAC module of claim 7 further comprises:
   the analog signal including amplitude modulation information when the DAC module in the first mode; and
   the analog signal including power level information when the DAC module is in the second mode.

9. A digital to analog conversion (DAC) module comprises:
   a digital to analog converter coupled to:
      convert a digital amplitude modulation information signal into an analog amplitude modulation information signal when the DAC module is in a first mode; and
      convert a digital power level information signal into an analog power level information signal when the DAC module is in a second mode;
   a switch module coupled to provide the analog amplitude modulation information signal as an output of the DAC module when the DAC module in the first mode and to provide the analog power level information signal to a sample and hold circuit when the DAC module in the second mode; and
   the sample and hold circuit coupled to sample the analog power level information signal to produce a sampled analog power level information signal as the output of the DAC module.

10. The DAC module of claim 9, wherein the digital to analog converter comprises:
    a sigma-delta modulator coupled to convert to the digital amplitude modulation or power level information signal into a sigma-delta modulated signal;
    a current amplifier section coupled to convert the sigma-delta modulated signal into an analog current; and
    a voltage to current module coupled to convert the analog current into the analog amplitude modulation or power level information signal.

11. The DAC module of claim 10, wherein the voltage to current module comprises:
    a variable current source coupled to produce a reference current based on the analog current; and
    an impedance coupled to produce the analog amplitude modulation or power level information signal based on the reference current.

12. The DAC module of claim 11, wherein the impedance comprises:
a variable impedance coupled to produce the analog amplitude modulation or power level information signal in accordance with a current-to-voltage gain setting.

13. The DAC module of claim 11, wherein the voltage to current module comprises:
the variable current source coupled to produce a reference current based on the analog current and a current-to-voltage gain setting.

14. The DAC module of claim 9 further comprises:
a multiplexer coupled to provide the digital amplitude modulation information signal to the digital to analog converter when the DAC module is in the first mode and coupled to provide the digital power level information signal to the digital to analog converter when the DAC module is in the second mode.

* * * * *

UNITED STATES PATENT AND TRADEMARK OFFICE
CERTIFICATE OF CORRECTION

| | | |
|---|---|---|
| PATENT NO. | : 7,737,872 B2 | Page 1 of 1 |
| APPLICATION NO. | : 12/142918 | |
| DATED | : June 15, 2010 | |
| INVENTOR(S) | : Mohammad Nariman et al. | |

It is certified that error appears in the above-identified patent and that said Letters Patent is hereby corrected as shown below:

Title Page:

(57) Abstract: Line 8, after "DAC module" insert --is--
(57) Abstract: Line 9, after "DAC module" insert --is--

Col. 12, Claim 8, line 29, after "module" insert --is--
Col. 12, Claim 9, Line 42, after "DAC module" insert --is--
Col. 12, Claim 9, Line 44, after "module" insert --is--

Signed and Sealed this
Twentieth Day of March, 2012

David J. Kappos
*Director of the United States Patent and Trademark Office*